(12) United States Patent
Arakawa

(10) Patent No.: US 7,009,779 B2
(45) Date of Patent: Mar. 7, 2006

(54) MACRO LENS

(75) Inventor: Akio Arakawa, Saitama (JP)

(73) Assignee: Tamron Co., Ltd., Saitama-Ken (JP)

( * ) Notice: Subject to any disclaimer, the term of this patent is extended or adjusted under 35 U.S.C. 154(b) by 23 days.

(21) Appl. No.: 11/016,850

(22) Filed: Dec. 21, 2004

(65) Prior Publication Data

US 2005/0141102 A1  Jun. 30, 2005

(30) Foreign Application Priority Data

Dec. 26, 2003  (JP) ............................. 2003-434152

(51) Int. Cl.
  *G02B 15/14* (2006.01)
(52) U.S. Cl. ...................... 359/681; 359/705; 359/740; 359/749; 359/754
(58) Field of Classification Search ................ 359/681, 359/705, 740, 749, 754
See application file for complete search history.

(56) References Cited

U.S. PATENT DOCUMENTS 5,159,493 A * 10/1992 Tsutsumi .................... 359/680
6,894,847 B1 * 5/2005 Suzuki ...................... 359/749

* cited by examiner

Primary Examiner—Evelyn A. Lester
(74) Attorney, Agent, or Firm—Jacobson Holman PLLC

(57) ABSTRACT

A macro lens comprised of a front lens group of a retrofocus type and a rear lens group of which component lenses are aligned in the order from the closest to the subject. The front lens group includes a first lens of a negative meniscus lens having its convex surface projecting toward the object, a second lens of a positive lens having its one surface with greater curvature oriented toward the object, a third lens of a positive lens having its one surface with greater curvature oriented toward the object, a fourth lens of a negative lens having its concave surface with greater curvature oriented toward the imaging plane, fifth and sixth lenses of a junction lens in combination of a negative lens with a positive lens, the negative lens having its one surface with greater curvature oriented toward the object, across a space having an aperture stop, and a seventh lens of a positive lens having its one surface with greater curvature oriented toward the imaging plane, the rear lens group including an eighth negative lens and a ninth positive lens, the macro lens providing relations expressed as follows:

$$1.0 < |F_1|/F_t < 1.3 \quad (1)$$

$$4.0 < |F_r|/F_t < 6.0 \quad (2)$$

where $F_1$ is a focal length of the first lens, $F_r$ is the focal length of the rear lens group, and $F_t$ is the focal length of the total optics of the.

1 Claim, 5 Drawing Sheets

ASTIGMATISM

DISTORTION

SPHERICAL ABERRATION    SINE CONDITION

CHROMATIC ABERRATION OF MAGNIFICATION

ASTIGMATISM

DISTORTION

MACRO LENS

FIELD OF THE INVENTION

The present invention relates to a macro lens, and more particularly, it relates to a macro lens suitable for use in a photographic camera dedicated to 35 mm film, a video camera, electronic still camera, and a broadcasting TV camera, and the like.

BACKGROUND ART

In general, a typical camera lens has its reference of aberration compensation placed in some infinitely far from the lens while a macro lens compensates aberration with the reference of proximity to the lens. However, such a macro lens is likely to be often used for the ordinary image pickup, and thus, the macro lens is desirably to be capable of compensating aberration, well covering the proximate distance through the infinitely far distance. For this purpose, a floating mechanism is employed where at least two of lens groups are independently moved for focusing. The macro lens provided in this manner is capable of covering a greater image pickup range including equi-magnification photography (see Patent Documents 1 and 2 listed below).

On the other hand, another type of the macro lens has a retrofocus fore lens group (see Patent Document 3).

Exemplary commercially available macro lenses of a reduced focal length include Minolta AF Macro Zoom 3×–4×(F1.77–F2.8) and Olympus Zuiko 20 mm (F2) although both of them are suitable for a relatively close image pickup range but not for the infinite photography.

List of Patent Documents Cited above:

(1) Japanese Patent Laid-Open No. SH062-195617 (incorporated herein as its whole)

(2) Japanese Patent Laid-Open No. SH063-247713 (incorporated herein as its whole)

(3) Japanese Patent Laid-Open No. H01-214812 (incorporated here as its whole)

A photographic camera lens dedicated to 35 mm silver-lead film has been used for a digital still camera with reduced sized image pickup elements such as CCD besides a camera for the imaging size of the current 35 mm film. Thus, the focal length of the lens has been reduced more to obtain the equivalent image angle as attained in the 35 mm film. Many macro lenses with the floating mechanism are typically based upon Gauss lens system, and their focal lengths are as short as 50 mm which is insufficient to attain the wide-angle.

Some macro lenses are of more reduced focal length but are restricted in their uses because they are photography lenses for the close image pickup range only, improper to the infinite photography that are the most frequent use.

The macro lenses as disclosed in Patent Documents 1 and 2 commonly employ the floating mechanism, but they are disadvantageous in that a greater displacement of lenses accordingly increases the total length of the lens system. In addition, a diameter of the lenses is increased to ensure a sufficient amount of peripheral light, and this causes an adverse effect to deteriorate compactness and portability.

In the disclosures of Patent Documents 1 and 2, the second lens group has a reduced power to avoid the supposed degradation of the usefulness of the Gauss lens system due to the loss of symmetry of the lenses about the aperture stop, and this causes an additional problem of a greater displacement of the lenses for focusing.

A typical approach to reduce the focal length is using the retrofocus lens. In the retrofocus macro lens disclosed in Patent Document 3, however, a lens architecture depends especially upon how restricted a change in astigmatism should be in a wide image pickup range covering the infinite distance through the equi-magnification photography, and radii of curvature r5 and r6 of the third lens are not so different from each other, and z value is small which gives a guideline of the accuracy in the centering of the lenses. For that purpose, the machining accuracy and centering/de-centering accuracy of the third lens affects significantly upon the whole lens system.

Accordingly, it is an object of the present invention to provide a macro lens with a floating mechanism characterized by enhanced compactness and portability, a focal length suitable for the wide-angle photography, improved optical performance covering a wide image pickup range from the infinite distance through the equi-magnification photography, a greater power and a reduced displacement of the second lens group (the rear lens group), a reduced total length of the lens system, and the optimized focal length of the first lens group to avoid the degradation of comatic aberration due to the raised power of the second lens group.

In an aspect of the present invention, the macro lens comprises of a front lens group of a retrofocus type and a rear lens group of which component lenses are aligned in the order from the closest to the subject, the front lens group including a first lens of a negative meniscus lens having its convex surface projecting toward the object, a second lens of a positive lens having its one surface with greater curvature oriented toward the object, a third lens of a positive lens having its one surface with greater curvature oriented toward the object, a fourth lens of a negative lens having its concave surface with greater curvature oriented toward the imaging plane, fifth and sixth lenses of a junction lens in combination of a negative lens with a positive lens, the negative lens having its one surface with greater curvature oriented toward the object, across a space having an aperture stop, and a seventh lens of a positive lens having its one surface with greater curvature oriented toward the imaging plane, the rear lens group including an eighth negative lens and a ninth positive lens, the macro lens providing relations expressed as follows:

$$1.0 < |F_1|/F_t < 1.3 \quad (1)$$

$$4.0 < |F_r|/F_t < 6.0 \quad (2)$$

where $F_1$ is a focal length of the first lens, $F_r$ is the focal length of the rear lens group, and $F_t$ is the focal length of the total optics of the lenses.

The above formula (1) defines a refractive index of the first lens incorporated for retrofocus. Exceeding the lower limit defined in the formula, it is hard to ensure backfocus because of the diminished beam divergence. Reverse to this, exceeding the upper limit, the higher refractive index of the first lens leads to the loss of appropriate control over changes in spherical aberration and comatic aberration associated with a varied distance.

The above formula (2) defines a refractive index of the second lens group controlling a displacement of the lenses. Exceeding the lower limit defined in the formula, the refractive index goes to negative to reduce the displacement required for employing the floating mechanism and accordingly decrease the total length of the lens system. As can be recognized, the lens system has enhanced compactness and portability but has some adverse effect as difficulty in compensating for distortion aberration caused in the second lens group. Additionally, since the focal length of the whole lens system is adjusted to the wide-angle photography, it is hard to compensate for a curvature of the peripheral image. Exceeding the upper limit, the displacement of the lenses is increased, which results in increases in the total length of the lens system and in the diameter of the front lens group.

The first negative lens serves to diverge beams so as to ensure backfocus despite the reduced focal length. The first and second lenses in combination serve to compensate for the degradation of distortion aberration. Moreover, the third lens effectively causes the fourth and fifth lenses to be in symmetrical shape relative to the position of the aperture, and this is useful to sufficiently compensate for comatic aberration as in the Gauss lens system. While focusing the beams from the infinitively far to the proximity, the first and second lens groups move toward the object, spreading their relative distance from each other. In order to reduce the displacement of the lenses, the second lens group raises power. In order to avoid the loss of symmetry due to such a raised power of the second lens group, the first lens has its focal length adjusted to compensate for comatic aberration.

In this way, in accordance with the present invention, the macro lens with the floating mechanism attains enhanced compactness and portability, a focal length suitable for the wide-angle photography, improved optical performance covering a wide image pickup range from the infinite distance through the equi-magnification photography, a greater power and a reduced displacement of the second lens group (the rear lens group), a reduced total length of the lens system, and the optimized focal length of the first lens group to avoid the degradation of comatic aberration due to the raised power of the second lens group.

DETAILED DESCRIPTION OF THE INVENTION

Figure 1:
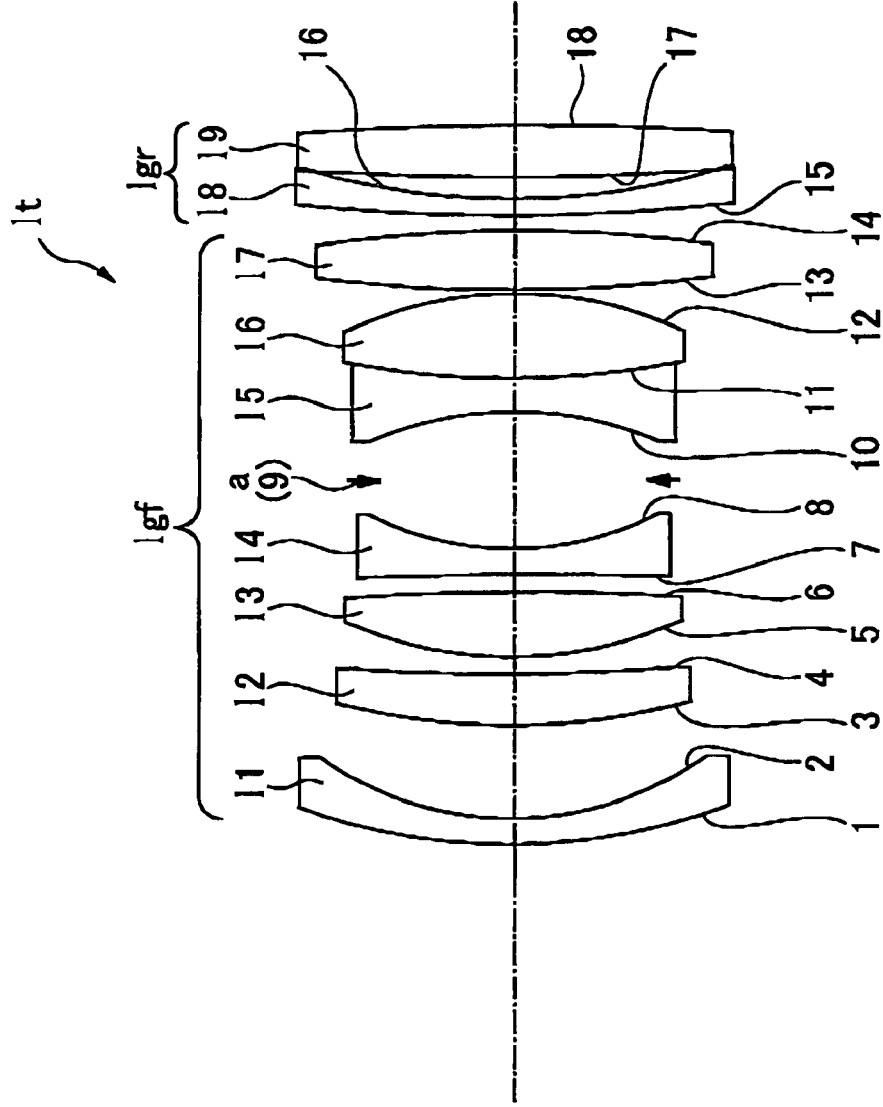
FIG. 1 is a diagram showing an optical structure of an exemplary macro lens according to the present invention.

An embodiment of a macro lens according to the present invention will now be described. The macro lens, as can be seen in FIG. 1, consists of a front lens group of a retrofocus type 1gf of focal length denoted by $F_f$ and a rear lens group 1gr of focal length denoted by $F_r$ of which component lenses are aligned in the order from the closest to the subject.

The front lens group includes a first lens 11 of a negative meniscus lens of focal length $F_1$ having its convex surface projecting toward the object, a second lens 12 of a positive lens having its one surface with greater curvature oriented toward the object, a third lens 13, a fourth lens 14 of a negative lens having its concave surface with greater curvature oriented toward the imaging plane, and fifth and sixth lenses 15 and 16 of a junction lens in combination of a negative lens with a positive lens. The negative lens of the fifth lens 15 has its one surface with greater curvature oriented toward the object, across a space having an aperture stop 9. The front lens group 1gf further includes a seventh lens 17 of a positive lens having its one surface with greater curvature oriented toward the imaging plane.

The rear lens group 1gr includes an eighth negative lens 18 and a ninth positive lens 19.

Optical data on this macro lens are represented in Table I below.

TABLE I

| Surface # | Radius of Curvature | Distance between Lenses | Refractive Index (Nd) | Divergence (vd) |
|---|---|---|---|---|
| 1 | 31.6199 | 1.5 | 1.6968 | 55.5 |
| 2 | 16.7527 | 5.5085 | 1 | |
| 3 | 35.0056 | 3 | 1.71736 | 29.5 |
| 4 | 112.2450 | 1 | 1 | |
| 5 | 21.0899 | 3.8 | 1.72 | 50.2 |
| 6 | −113.6018 | 1 | 1 | |
| 7 | −236.0144 | 1.5 | 1.62004 | 36.3 |
| 8 | 16.2037 | 4 | 1 | |
| 9 | Inf | 4 | 1 | |
| 10 | −18.5743 | 2 | 1.71736 | 29.5 |
| 11 | 43.7590 | 5 | 1.72 | 50.2 |
| 12 | −19.9225 | 0.2 | 1 | |
| 13 | 77.1221 | 3.5 | 1.7725 | 49.6 |
| 14 | −69.5010 | 0.8959 | 1 | |
| 15 | 102.0026 | 1 | 1.6968 | 55.5 |
| 16 | 36.4508 | 1.3 | 1 | |
| 17 | 160.8567 | 3 | 1.64769 | 33.8 |
| 18 | −160.8567 | BF | | |

The focal length $F_1$ of the first lens 11 is 53.34 mm, and the focal length $F_r$ of the rear lens group 1gr is −250.00 mm.

An object distance of the present macro lens, a distance between lenses for the floating, and the backfocus (BF) are given in TABLE II as follows.

TABLE II

| Object Distance | Distance 14 | BF |
|---|---|---|
| Inf | 0.8959 | 42.203 |
| Equi-Magnification | 18.906 | 60.213 |

Figure 2:
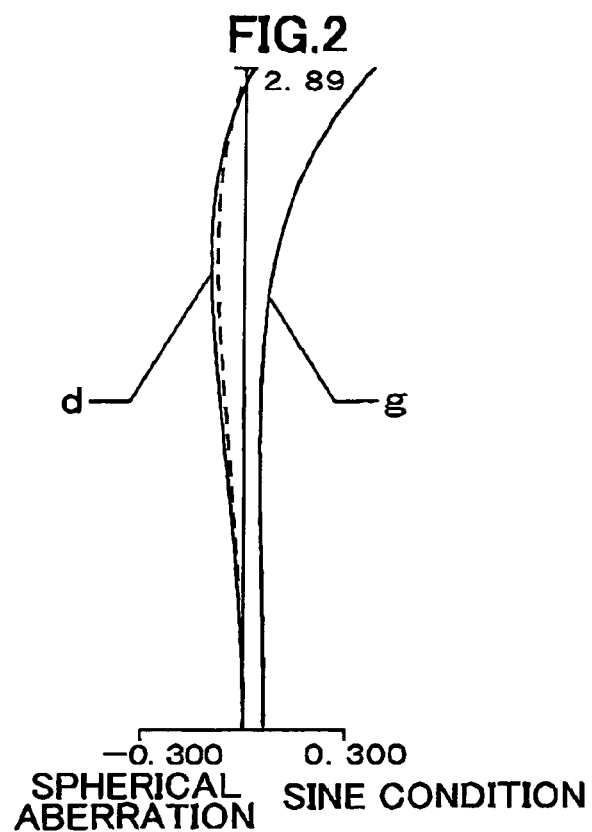
FIG. 2 is a diagram illustrating spherical aberration and sine conditions in infinite focusing of the exemplary macro lens according to the present invention.
Figure 3:
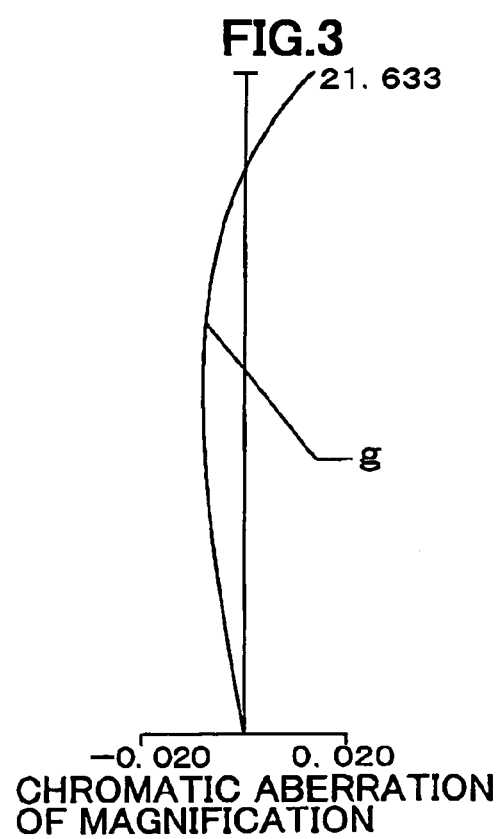
FIG. 3 is a diagram illustrating chromatic aberration of magnification in infinite focusing of the exemplary macro lens according to the present invention.
Figure 4:
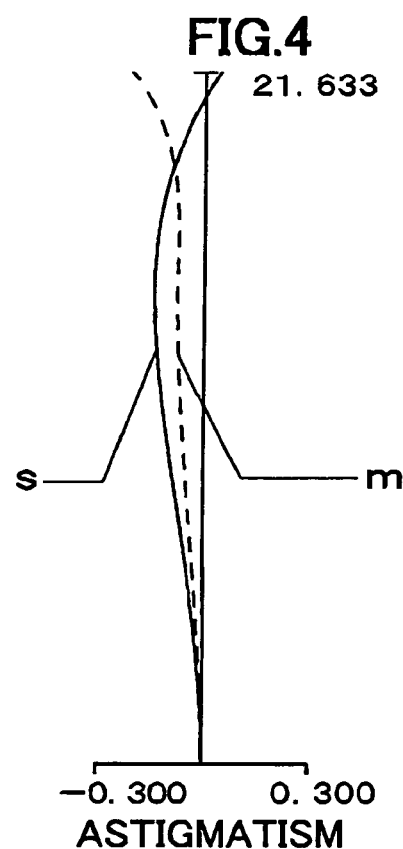
FIG. 4 is a diagram illustrating astigmatism in infinite focusing of the exemplary macro lens according to the present invention.
Figure 5:
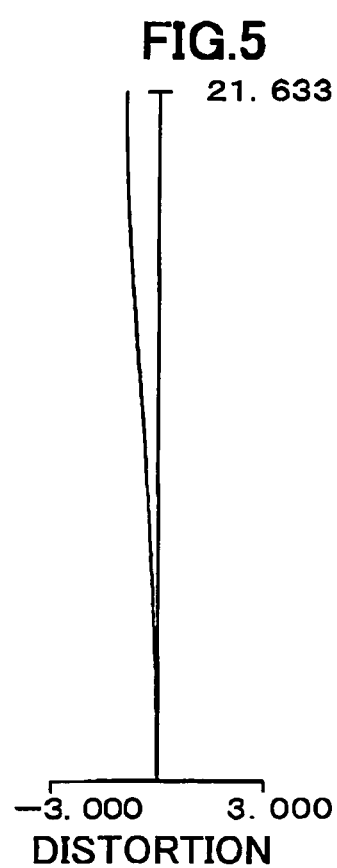
FIG. 5 is a diagram illustrating distortion aberration in infinite focusing of the exemplary macro lens according to the present invention.

Spherical aberration and sine conditions in infinite focusing of this macro lens are as given in FIG. 2. Chromatic aberration of magnification in infinite focusing of the macro lens is as given in FIG. 3. Astigmatism in infinite focusing of the macro lens is as given in FIG. 4. Distortion aberration in infinite focusing of the macro lens is as given in FIG. 5.

Figure 6:
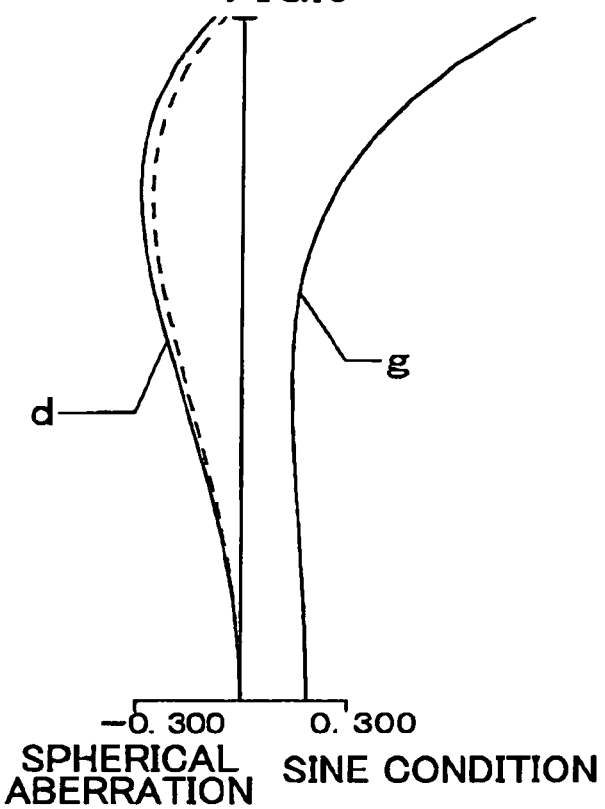
FIG. 6 is a diagram illustrating spherical aberration and sine conditions in equi-magnification image focusing of the exemplary macro lens according to the present invention.
Figure 7:
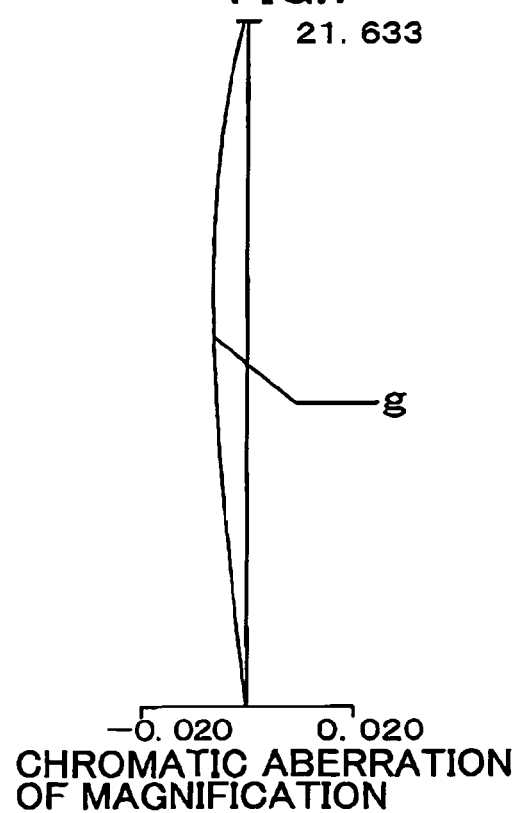
FIG. 7 is a diagram illustrating chromatic aberration of magnification in equi-magnification image focusing of the exemplary macro lens according to the present invention.
Figure 8:
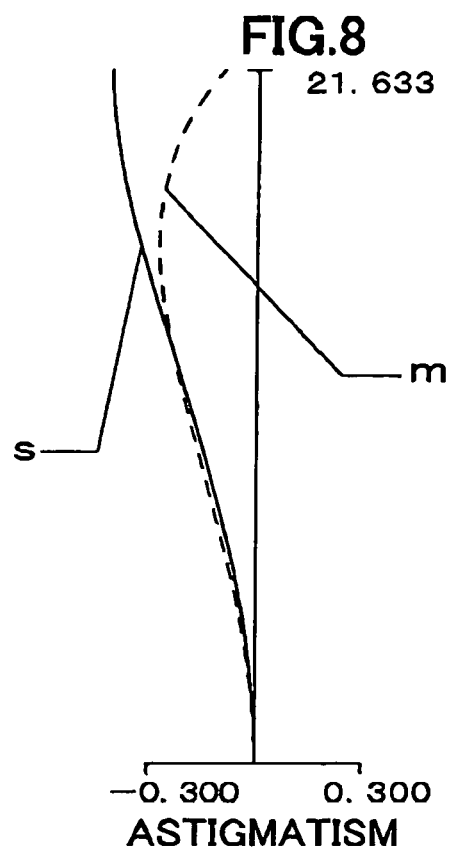
FIG. 8 is a diagram illustrating astigmatism in equi-magnification image focusing of the exemplary macro lens according to the present invention.
Figure 9:
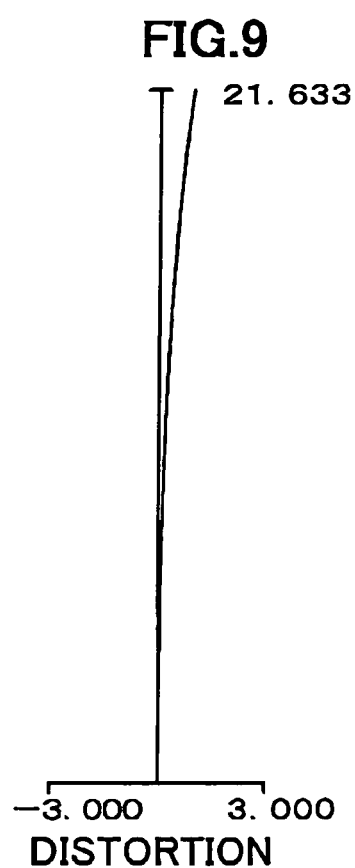
FIG. 9 is a diagram illustrating distortion aberration in equi-magnification image focusing of the exemplary macro lens according to the present invention.

The spherical aberration and the sine conditions in equi-magnification image focusing of this macro lens is as given in FIG. 6. The chromatic aberration of magnification in equi-magnification image focusing of this macro lens is as given in FIG. 7. The astigmatism in equi-magnification image focusing of this macro lens is as given in FIG. 8. The distortion aberration in equi-magnification image focusing of the macro lens is as given in FIG. 9.

What is claimed is:

1. A macro lens comprised of a front lens group of a retrofocus type and a rear lens group of which component lenses are aligned in the order from the closest to the subject, the front lens group including
    a first lens of a negative meniscus lens having its convex surface projecting toward the object,
    a second lens of a positive lens having its one surface with greater curvature oriented toward the object,
    a third lens of a positive lens having its one surface with greater curvature oriented toward the object,
    a fourth lens of a negative lens having its concave surface with greater curvature oriented toward the imaging plane,
    fifth and sixth lenses of a junction lens in combination of a negative lens with a positive lens, the negative lens having its one surface with greater curvature oriented toward the object, across a space having an aperture stop, and
    a seventh lens of a positive lens having its one surface with greater curvature oriented toward the imaging plane,
    the rear lens group including an eighth negative lens and a ninth positive lens,
    the macro lens providing relations expressed as follows:

$$1.0 < |F_1|/F_t < 1.3 \tag{1}$$

$$4.0 < |F_r|/F_t < 6.0 \tag{2}$$

where $F_1$ is a focal length of the first lens, $F_r$ is the focal length of the rear lens group, and $F_t$ is the focal length of the total optics of the lenses.

* * * * *